United States Patent
Boster et al.

[11] 3,759,407
[45] Sept. 18, 1973

[54] TOWING VEHICLE

[76] Inventors: Everett Boster, W. Star Rt., McLeansboro; James E. Willis, R.R. No. 1, Ewing, both of Ill.

[22] Filed: Mar. 22, 1971

[21] Appl. No.: 126,842

[52] U.S. Cl. .......................... 214/86 A, 254/139.1
[51] Int. Cl. ............................................... B60p 3/12
[58] Field of Search ............... 214/86 A; 254/139.1, 254/145

[56] References Cited
UNITED STATES PATENTS 3,127,037  3/1964  Newman ........................... 214/86 A
3,415,397  12/1968  O'Banion ........................... 214/86 A Primary Examiner—Albert J. Makay
Attorney—Warren D. Flackbert

[57] ABSTRACT

A towing vehicle characterized by a wheel mounted framework having a downwardly disposed vehicle receiving member, where winch means move a crossmember to which the towed vehicle is secured, and where support chains extending between a portion of the framework and the crossmember assume the load of the towed vehicle upon release of the winch means.

3 Claims, 5 Drawing Figures

PATENTED SEP 18 1973

INVENTORS
EVERETT E. BOSTER
JAMES E. WILLIS
BY
ATTORNEY

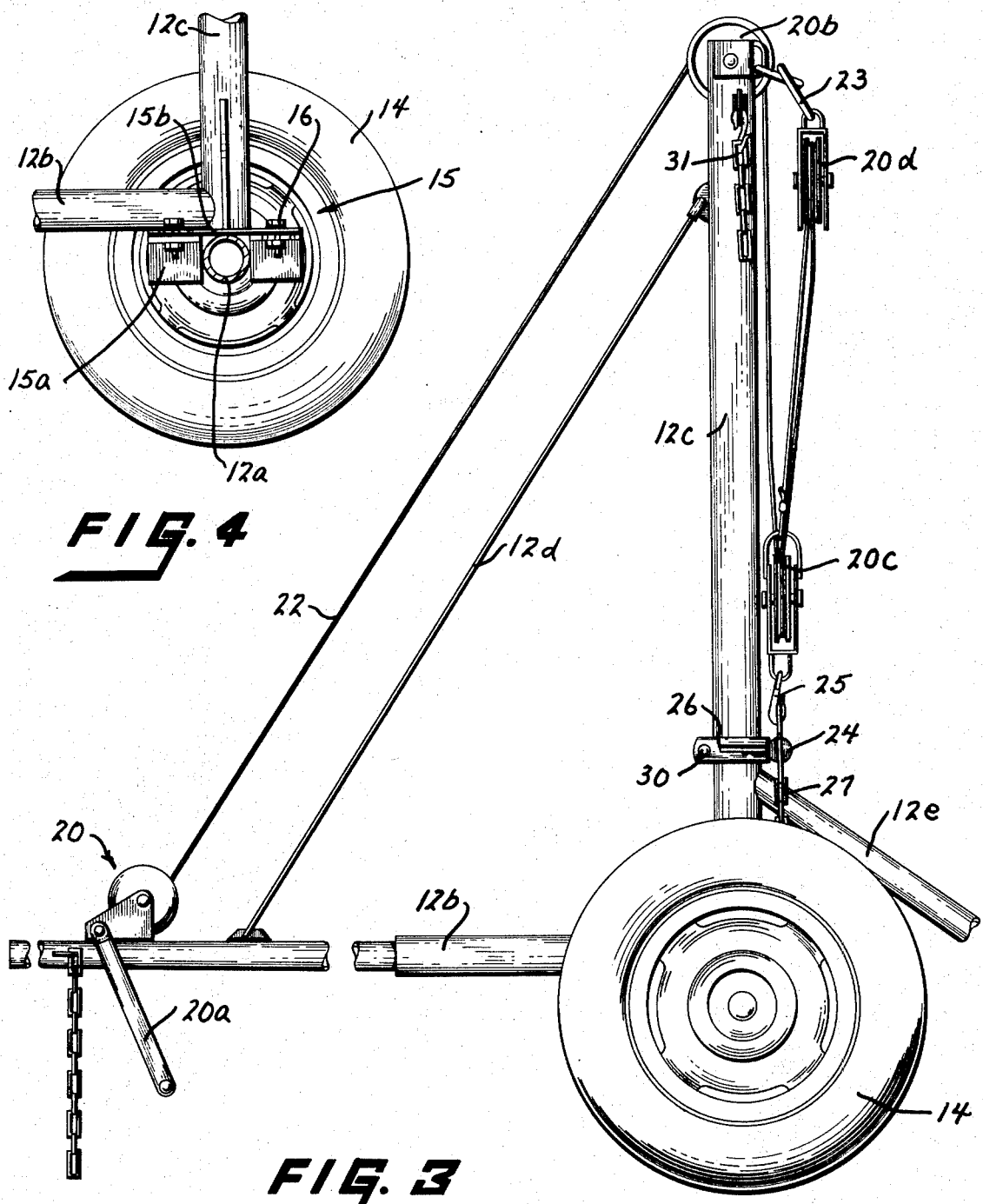

TOWING VEHICLE

As is known, existing tow trucks, wreckers or the like are quite costly, not only in initial investement but in use and maintenance. The need has arisen for some type of towing vehicle for transporting older cars, for example, from one location to another. The need should be satisfied by a relatively inexpensive structure capable of being readily secured to another vehicle, such as an automobile or a small truck, for example, and having adaptability for ease in loading the towed vehicle as well as the safe transporting of such vehicle.

The present invention satisfies the aforedescribed requirements for a lower cost yet highly effective towing vehicle. In this regard, and briefly, the vehicle defining the invention comprises a framework having conventional hitch means at one end thereof. An upstanding mast member is disposed in the mid portion of the axle extending between the wheels of the vehicle, where a winch mechanism, with its usual mechanical advantage, is disposed on the aforesaid framework and upstanding member.

A crossmember, to which the towed vehicle is secured, is moved through the operation of the winch mechanism, where the towed vehicle, in transporting position, moves along an inclined portion on the framework, so that the front thereof is elevated. The towed vehicle is readily and effectively positioned for transporting and, conversely, is easily released from the towing vehicle at the desired location. All of the preceding is accomplished through a low cost structure, and one which provides important safety during use.

A better understanding of the invention will become more apparent from the following description, taken in conjunction with the accompanying drawings, wherein FIG.1 is a view in elevation, partly broken away, showing the towing vehicle defining the invention;

FIG. 3 is a view in side elevation of the instant towing vehicle;

FIG. 4 is a view in vertical section, taken at line 4—4 of FIG. 1 and looking in the direction of the arrows, showing further details of the invention; and, FIG. 5 is a top plan view, partly fragmentary and partly in cross-section, showing a stabilizing arrangement forming a detail of the invention.

Figures 1, 2:
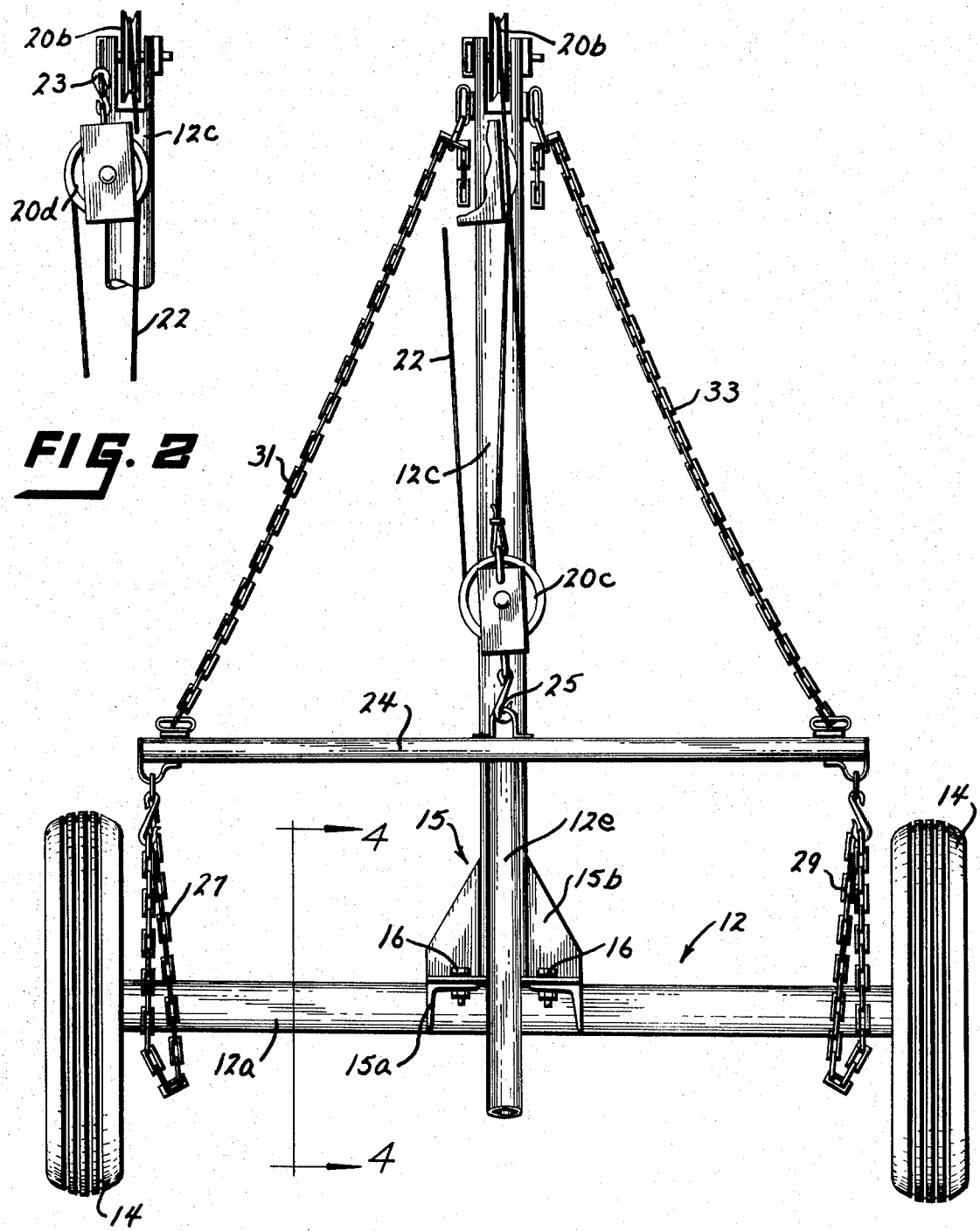
FIG. 2 is a fragmentary view, also in elevation, of a portion of the winch mechanism, removed from FIG. 1 to make the latter more clear in presentation.

For the purposes of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Referring now to the figures, the towing vehicle of the invention comprises a framework 12 including an axle 12a for wheels 14, and a spine member 12b having conventional hitch means (not shown) at its free end. A mast member 12c extends upwardly from the mid-area of the axle 12a, being positioned on such axle 12a through a web and plate assembly 15 (see FIGS. 1 and 4).

A lower portion 15a of the aforesaid web and plate assembly 15 is disposed, by welding, for example, on either side of the axle 12a, where an upper portion 15b, forming part of the member 12c also through welding, for example, is positioned on lower portion 15a through nut and bolt assemblies 16. A series of staggered holes (evident by the broken lines in the drawings) permit the ready positioning of the upper portion 15b of the plate and web assembly 15 with respect to the lower portion 15a, and, hence, the relative positioning of member 12c.

The framework 12 is further completed through a strengthening member 12d which extends between the spine member 12b and the member 12c. A downwardly angling member 12e is secured to the member 12c, and serves to receive the towed vehicle during loading and transporting, to be discussed further herebelow.

Referring now to FIGS. 1, 2 and 3, a winch mechanism 20 is provided having the usual crank member 20a which rolls or unrolls a cable 22, the latter passing over a pulley 20b rotatably mounted on the top of mast member 12c. The cable 22 thereafter passes around another pulley 20c, and then to still another pulley 20d, the latter being positioned, by hook means 23 on a portion of the member 12c. The cable 22 then passes to the pulley 20c and supports same, where the preceding is conventional in providing the desired mechanical advantage.

A crossmember 24 is positioned by structure about the pulley 20c through, typically, a hook member 25. The crossmember 24 has chains 27 and 29 extending from its free ends, the latter serving to secure a vehicle to be towed. Chains 31 and 33 extend from the upper portion of the member 12c to the free ends of the crossmember 24. As should be apparent from the drawings, the length of chains 31 and 33 employed may be varied, as necessary. The crossmember 24 further includes a yoke 26 and a pin 30, the yoke 26 encircling a portion of member 12c.

Figure 5:
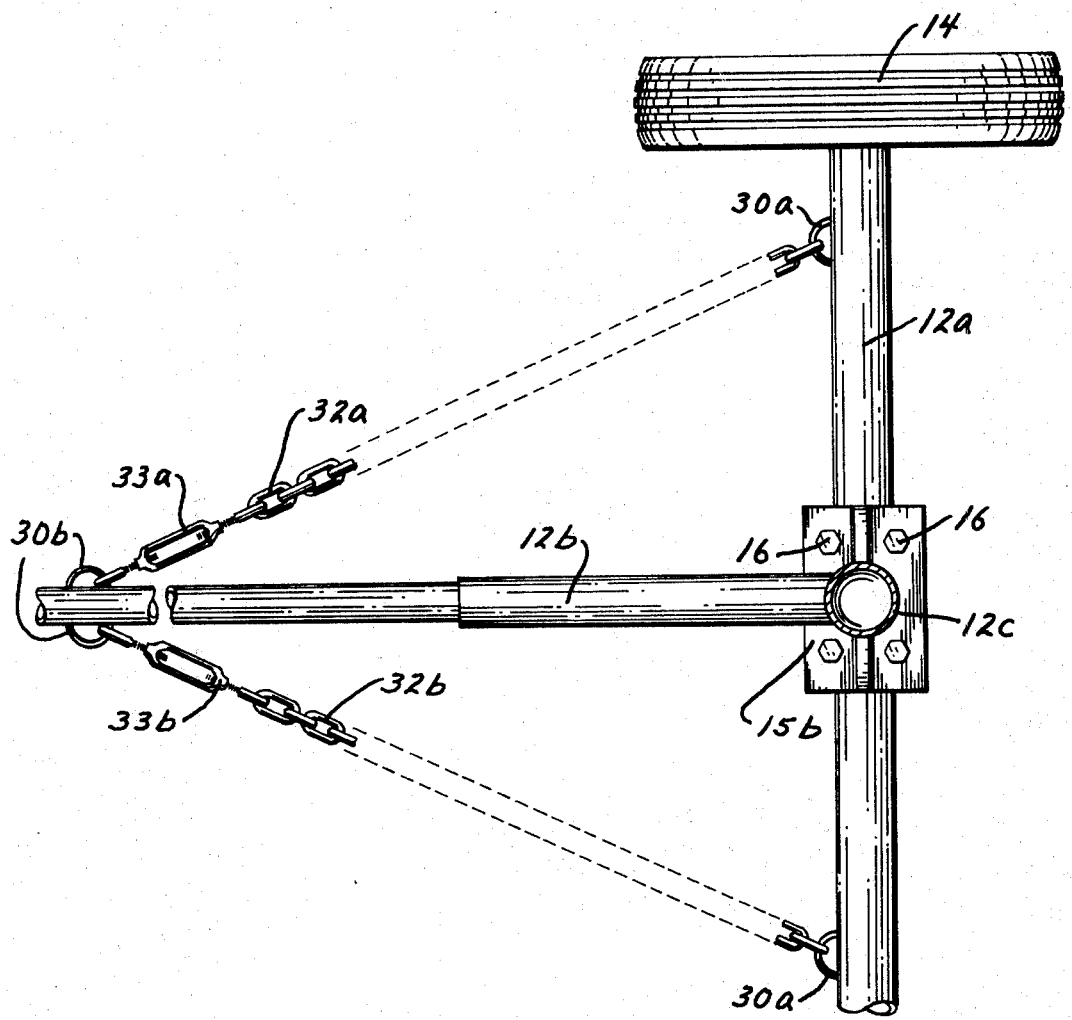

As to FIG. 5, a stabilizing arrangement is provided for spine member 12b, i.e., to minimize any lateral sway during use. In this connection, loops 30a are provided on axle 12a, while loops 30b are provided on spine member 12b. Typically, the aforesaid loops 30a and 30b are welded into position. Chains 32a and 32b, and associated turnbuckles 33a and 33b, extend between loops 30a and 30b. The tightening of the turnbuckles 33a and 33b tension the respective chains 32a and 32b, minimizing any sway of spine member 12b.

In use, with the towing vehicle secured to a lightweight truck, automobile or the like, portions of the towed vehicle are secured by wrapping action of the chains 27 and 29. The preceding is typically accomplished after the yoke 26 is released, through the removal of a pin 30, from its encircling position around member 12c.

In any event, the winch mechanism 20 is caused to operate, making the crossmember 24 move upwardly, as well as the towed vehicle, the latter bearing, during movement, on the angling member 12e. When the towed vehicle reaches the transporting position, the crossmember 24 is again secured to mast member 12c, by returning the pin 30 through its opening in yoke 26. Chains 31 and 33 are then hooked to the desired length, and the winch mechanism 20 is somewhat released, meaning that the chains 31 and 33 move into tension and assume the load of the towed vehicle.

When the desired location is reached, the reverse of the aforesaid procedure accomplishes unloading action. In this regard, the winch mechanism 20 is tightened so that the cable 22 moves the crossmember 24 upwardly, removing the tension and load on chains 31 and 33. The chains 31 and 33 are then unhooked. The winch mechanism 20 is then operated to lower the vehicle along the angling member 12e, after, of course, thepin 30 has been removed from the yoke 26. The chains 27 and 29 are then removed from the towed vehicle. When the towing vehicle is moved without a towed vehicle, the yoke 26 and pin 30 are typically assembled to control any unwanted movement of the crossmember 24.

From the preceding, it should be apparent that the invention provides effective structure for loading, transporting and unloading a towed vehicle. Positive action accompanies the preceding, where safety and sturdiness is afforded. The towing vehicle described hereabove is, of course, susceptible to various changes within the spirit of the invention. For example, proportioning may be changed, other than chains 31 and 33 employed, or the like. Thus, the above description should be considered illustrative and not as limiting the scope of the following claims:

We claim:

1. A towing vehicle comprising a wheel mounted framework including a downwardly and rearwardly angling mast member on which another vehicle rides, an upstanding member forming part of said framework, winch means including a cable trained over the free end of the mast member, a crossmember connecting the free end of said winch means and movable with said cable, means disposed proximate the free ends of said crossmember securing said another vehicle to said crossmember, load carrying means extending between portions of said upstanding mast member and proximate the free ends of said crossmember, and structure on said framework mounting said upstanding mast member, said structure having an upper portion and a lower portion, each portion including apertures and means for selectively mounting said upper and lower portions with respect to the other.

2. The towing vehicle of claim 1 where said framework includes a forwardly extending member, and where stabilizing means extend between said forwardly extending member and on opposite sides thereof to other portions of said vehicle.

3. The towing vehicle of claim 2 where said stabilizing means are defined as chains.

* * * * *